US009911122B2

(12) United States Patent
Ghetler

(10) Patent No.: US 9,911,122 B2
(45) Date of Patent: Mar. 6, 2018

(54) AUDIO-BASED ELECTRONIC TRANSACTION AUTHORIZATION SYSTEM AND METHOD

(71) Applicant: Marina Dina Sonnino Ghetler, São Paulo-SP (BR)

(72) Inventor: Marina Dina Sonnino Ghetler, São Paulo-SP (BR)

(73) Assignee: MG Systems Consulting Services LLC, Miami, FL (US)

( * ) Notice: Subject to any disclaimer, the term of this patent is extended or adjusted under 35 U.S.C. 154(b) by 354 days.

(21) Appl. No.: 13/738,209

(22) Filed: Jan. 10, 2013

(65) Prior Publication Data

US 2014/0195428 A1  Jul. 10, 2014

(51) Int. Cl.
*G06Q 20/40* (2012.01)
*G06Q 20/32* (2012.01)

(52) U.S. Cl.
CPC ......... *G06Q 20/40* (2013.01); *G06Q 20/3272* (2013.01)

(58) Field of Classification Search
CPC ........... G06Q 20/40145; G06Q 20/401; G06Q 20/16; G06Q 20/40; G06Q 20/322;
(Continued)

(56) References Cited

U.S. PATENT DOCUMENTS 6,108,515 A * 8/2000 Freeman ................ G10L 15/26
360/27
8,014,756 B1 * 9/2011 Henderson .................... 455/411
(Continued)

FOREIGN PATENT DOCUMENTS

CN     201867900 U  *  8/2010 ............. G07F 19/20
GB     2 478 712      9/2011
(Continued)

OTHER PUBLICATIONS

Google Transaltion of CN201867900 U.*
(Continued)

*Primary Examiner* — Hao Fu
(74) *Attorney, Agent, or Firm* — Goodwin Procter LLP

(57) ABSTRACT

Methods and systems for facilitating and authorizing electronic transactions with various devices and systems are disclosed. Embodiments of the present invention utilize audio messages to initiate, process and complete transactions between two or more parties, allowing users to efficiently and effectively enter into and complete financial transactions with businesses and other users. The need to utilize text-based entry as part of the verification process—an inefficient, error-prone and insecure authorization mechanism—is minimized and, in some embodiments, avoided altogether. Unlike recently developed authorization methods, embodiments of the present invention may be implemented using any number of existing devices including, analog or digital televisions, radios, smartphones, tablets computers, and other devices. Embodiments of the present invention may also be utilized to facilitate authorization for various other transactions including to access to an account, website or other locations, to accept or propose trades, to sign a legal or non-legal document, and to verify identity.

30 Claims, 12 Drawing Sheets

(58) Field of Classification Search
CPC ............. G06Q 20/3224; G06Q 20/327; G06Q 20/3272; G06Q 20/382; G06Q 20/4014; G06Q 20/4016; G06Q 20/10; G06Q 20/18; G06F 11/0745; G08B 7/06
USPC .............................. 705/44; 455/411; 434/321
See application file for complete search history.

(56) References Cited

U.S. PATENT DOCUMENTS

| | | | |
|---|---|---|---|
| 8,078,136 | B2 | 12/2011 | Atsmon et al. |
| 2002/0169608 | A1 | 11/2002 | Tamir et al. |
| 2003/0236872 | A1 | 12/2003 | Atkinson |
| 2005/0172127 | A1* | 8/2005 | Hartung et al. ............... 713/167 |
| 2006/0131390 | A1* | 6/2006 | Kim ............................... 235/380 |
| 2012/0078737 | A1* | 3/2012 | Kulakowski ..................... 705/16 |
| 2013/0311768 | A1* | 11/2013 | Fosmark ............ G06Q 20/3223 713/155 |
| 2014/0164761 | A1* | 6/2014 | Kufluk et al. ................. 713/155 |

FOREIGN PATENT DOCUMENTS

| | | | | |
|---|---|---|---|---|
| GB | 2478712 A | * | 9/2011 | ............. G06Q 20/20 |
| NL | 2 008 646 | | 10/2012 | |
| WO | WO 2012/158057 | | 11/2012 | |

OTHER PUBLICATIONS

Madhavapeddy et al., Audio Networking: The Forgotten Wireless Technology, IEEE, Jul.-Sep. 2005.*

International Preliminary Report on Patentability and Written Opinion dated Jul. 23, 2015 from PCT/IB2014/000014, 9 pages.

Extended European Search Report dated Aug. 10, 2016 from PCT/IB2014/000014, 8 pages.

"Google Acquires SlickLogin, the Sound-Based Password Alternative", TC News, Feb. 16, 2014, pp. 1-2.

* cited by examiner

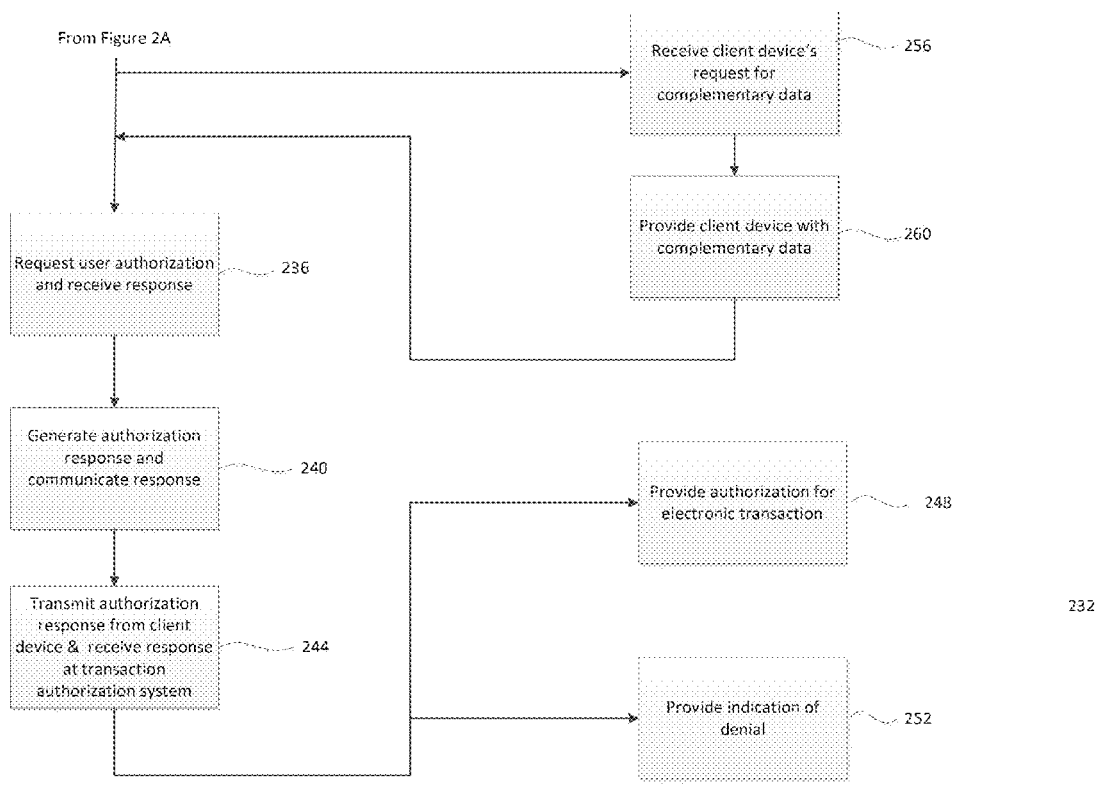

AUDIO-BASED ELECTRONIC TRANSACTION AUTHORIZATION SYSTEM AND METHOD

FIELD OF THE INVENTION

The invention is generally directed to electronic transaction authorization systems and methods and, in particular, is directed to methods and systems for facilitating and authorizing electronic transactions with devices and systems based on encoded audio messages.

BACKGROUND OF THE INVENTION

Consumers and financial institutions today rely heavily on various financial instruments to complete day-to-day transactions, be they complex or simple in nature—from investing in corporations by purchasing stocks, to purchasing merchandise at a retail store using a credit card. The financial transactions that are completed daily range in the trillions of dollars, but often exceed this amount. Accordingly, new systems and devices have been introduced into the marketplace aimed at making these transactions easier to complete. For example, banking customers may now log into their bank's online Website to complete various types of transactions. Further still, recently developed smartphones and tablets allow these same customers to pay their bills, make transfers and complete any number of financial transactions at many locations previously unconceivable.

While the accessibility of one's account and the ability to complete various forms of transactions have been improved with recent developments, the methods for authorizing access and authorizing transactions utilized today remain rudimentary at best. Current solutions fail to provide complete security at each and every point in a transaction—from transaction request to completion—including at the server environment, at the client environment, and along the connection path between the parties. The current solutions further fail to provide adequate security through a dynamic authentication method, through restrictions in usage where desired and necessary, and through transaction/audit recording.

Indeed, financial institutions and businesses still rely heavily on the use of a username and password to verify authorization for access to customer accounts and to complete transactions, despite the advances in technology in almost every other facet of financial transactions. Customers must still log in by entering some combination of a password and/or PIN. Text-based passwords, however, can be easily stolen or deduced by hackers and other unauthorized users. After all, many customers use common or basic passwords, such as some combination of birthdays, maiden names or lucky numbers. While lengthy PINs or multi-character and digit passwords may be utilized, or even required by some businesses, customers often simply add a digit or character to their basic password or simply repeat the characters of their simple passwords, rendering the additional requirements ineffective. In addition, requiring a user to enter a username and password to gain access or provide authorization is inefficient for the user, increases the likelihood of errors, and otherwise frustrates and impedes the user experience. While many companies have developed alternative solutions to text-based authorization, many of these solutions are also flawed and fail to make up for the deficiencies of the text-based authorization methods. For one, while many solutions increase security in certain areas, they still rely on manual text entry as a means to prove authorization.

For example, security methods developed by RSA require users not only to enter their username and their password, but also a dynamically generated 6-digit pin. As with simple username/password methods common in the industry, these solutions are slow and error-prone. In addition, security is not increased at the server environment or at the connection line between the parties. Furthermore, these methods require the involvement of Information Technology (IT) personnel and training of both IT members as well as customers with whom the IT members serve. Additionally, such solutions are costly and are not ordinarily affordable for average consumers.

Other developed solutions, further, fail to take advantage of those devices and systems already adopted by the consumers at large, and instead, require new devices and systems to be purchased by consumers and businesses alike. For example, to take advantage of wireless mobile payments, such as Google Wallet, consumers must purchase new smartphones with Near Field Communications (NFC) wireless technology. Likewise, businesses must make available devices capable of communicating via NFC with these mobile devices to complete transactions. Hesitant of yet another new technology and the need to purchase yet another new device, adoption of such solutions is slow and often unsuccessful. Businesses, for example, have not seen sufficient consumer interests in the use of NFC and, therefore, have not purchased NFC receivers for their retail locations. Likewise, consumers have recognized that even if they purchase the new smartphone they may not be able to utilize it at many locations. With both parties in the potential transaction hesitant to adopt the new technology, the uses of such technologies have been limited and the tipping point for mass-market adoption has yet to be reached. Similar market stagnation has been realized for similar authorization methods such as those involving the use of fingerprints, retinas, voices, or digital certificates for authorization. The effect of the flaws and deficiencies of these recently developed technologies are evident in the market as consumers today still remain reliant on the rudimentary username/password methods to provide access and transaction authorization. There is yet to be a transaction authorization solution in the marketplace that is secure, easy to use, and require minimal costs to implement and use.

Therefore, an improved solution for facilitating and authorizing electronic transactions that overcomes the flaws and deficiencies of currently available methods is needed.

SUMMARY OF THE INVENTION

Accordingly, methods and systems for facilitating and authorizing electronic transactions with various devices and systems are disclosed. In particular, embodiments of the present invention utilize encoded audio messages to initiate, process and complete transactions between two or more parties, allowing users to efficiently and effectively enter into and complete transactions with businesses and other users. At the same time, the need to utilize text-based entry as part of the verification process—an inefficient, error-prone and insecure authorization mechanism—is minimized and, in some embodiments, avoided altogether. Furthermore, unlike recently developed authorization methods, embodiments of the present invention may be implemented using any number of existing devices including, analog or digital televisions, radios, smartphones, tablets, computers, and other audio-capable devices. In addition to facilitating the authorization of financial transactions, the present invention may also be utilized to facilitate the authorization for various other transactions such as to gain access to an account, website or other locations, to accept or propose trades, to sign legal or non-legal documents, to demonstrate one's identity, and others.

One aspect of the present invention is a method of authorizing an electronic transaction. In the method, a request-emitting system, a request signal containing an encoded audio request message, is communicated to a request-emitting system, the request signal causing the encoded audio request message to be outputted at the request-emitting system for receiving by a receiving device. Further, the outputted encoded audio request message causes the receiving device to automatically decode the encoded audio request message, provide an authorization request to a user based on the decoded audio request message, and receive a request authorization from the user in order to generate an authorization response containing the request authorization and the request identifier. In addition, the method includes the step of receiving the authorization response from the receiving device and processing the authorization response to provide authorization for the electronic transaction.

In another aspect of the present invention, a method for processing an authorization request at a mobile device containing a processor and memory is disclosed. The mobile device is capable of receiving and processing encoded audio messages. First, an encoded audio authorization request is received and includes a request identifier. Further, the encoded audio authorization request is recorded and decoded, using the processor, to provide at least a portion of the decoded authorization request to a user. A request authorization is received from the user and, using the processor, an authorization response is generated to contain the request authorization and the request identifier. The authorization response is then transmitted to provide authorization accordingly.

In yet another aspect of the present invention, a system for facilitating the authorization of electronic transactions is disclosed. The system includes a processor and at least one storage device coupled to the processor. The processor is adapted to communicate with the at least one storage device to execute instructions to communicate to a request-emitting system a request signal containing an encoded audio request message that causes an encoded audio request message to be outputted at the request-emitting system for receiving by a receiving device. In addition, the processor is adapted to receive an authorization response from the receiving device containing a request authorization and a request identifier, and process the authorization response to provide authorization for the electronic transaction. Furthermore, the outputted encoded audio signal that is caused to be outputted at the request-emitting system causes the receiving device to automatically decode the encoded audio request message, the decoded audio request message containing a request identifier, and provide an authorization request to a user based on the decoded audio request message. Furthermore, the encoded audio signal causes a request authorization to be collected from the user in order to generate the authorization response.

BRIEF DESCRIPTION OF DRAWINGS

The present invention will now be described, by way of example only, with reference to the accompanying Figures, in which:

FIGS. 2A and 2B depict a method of authorizing a transaction in accordance with an embodiment of the present invention;

The following describes in detail various embodiments of the present invention. One of ordinary skill in the art would understand that standard programming and engineering techniques may be used to produce such embodiments including software, firmware, hardware, or any combination thereof, to implement the disclosed subject matter. The attached figures depict exemplary embodiments and are meant to be understood in view of the details disclosed herein.

DETAILED DESCRIPTION OF THE INVENTION

Embodiments of the present invention allow for the transaction authorization requests to be initiated by any device capable of outputting encoded audio to a client device. The client device, in turn, may process the encoded audio message and provide the user with the details of the authorization request. Users may provide authorization to complete the request transaction along with additional transaction-related information.

Figure 1:
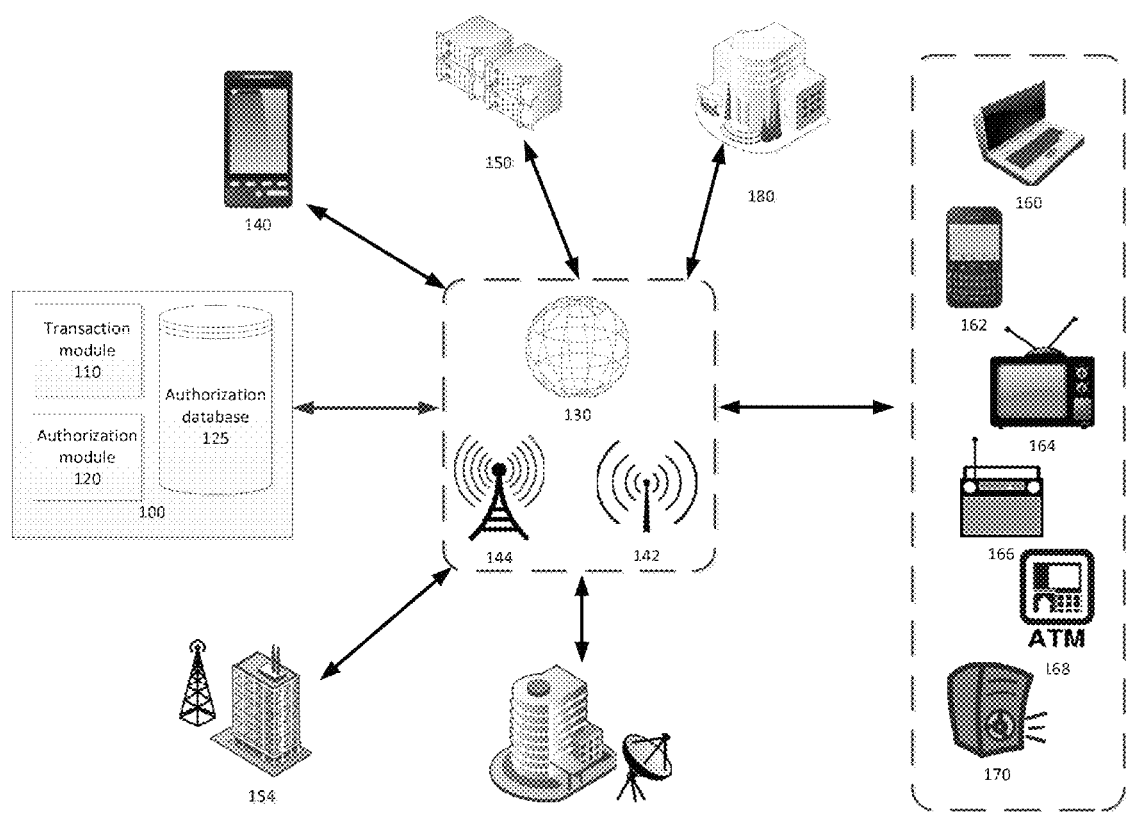
FIG. 1 depicts a transaction authorization system in accordance with an embodiment of the present invention.

FIG. 1 depicts a transaction authorization system 100 in accordance with an embodiment of the present invention. The transaction authorization system 100 may facilitate the processing of authorization requests and transactions between one or more clients and one or more entities. The transaction authorization system 100 includes a transaction module 110, an authorization module 120, and an authorization database 125. The transaction authorization system 100 is connected to a client device 140 via network 130.

In addition, the transaction authorization system 100 may connect to a plurality of devices and networks through which a user may receive transaction requests. In FIG. 1, the transaction authorization system 100 is shown to be connected to a computer server system 150, a television network system 152, and a radio network system 154. These systems 150, 152 and 154 may be associated with one or more entities, which may be any party that enters into a transaction with a client, such as a company (e.g., a company selling stocks, a broker), a financial institution (e.g., bank), a regulating agency (e.g., Internal Revenue Service (IRS)), or a store selling merchandise and goods (e.g., a grocery store). An entity may also simply be a single person interested in entering into a transaction with another person. In one embodiment, an entity may also connect to systems 150, 152 and 154 to enter into one or more transactions with clients. For example, FIG. 1 depicts an entity 180.

These systems may be further connected to devices such as computer 160, mobile device 162, television 164, radio 166, and ATM 168, and to general audio capable device 170. As depicted in FIG. 1, the communication between systems 150, 152, and 154 and the devices 160, 162, 164, 166, 168, 170, may be connected via a computer network 130, a television network 142, a radio network 144, as well as other types of networks well known in the art. As described in additional embodiments below, the transaction authorization system 100 may be further connected with various other networks and systems in order to facilitate the authorization of transactions.

The capabilities of the transaction authorization system 100 will now be described with reference to the flowcharts of FIGS. 2A and 2B, which depict a method of authorizing a transaction in accordance with an embodiment of the present invention. At 200, the method begins when a user, utilizing the computer 160, connect to computer server system 150 via computer network 130. The computer system 150 may be a web computer server system associated with an entity such as the user's bank. The user, for example, would like to make a money transfer from his checking account by accessing his or her bank's webpage through computer 160's web browser. At 200, the request for access to the bank's webpage is received at the computer server system 150. At 204, the user is provided with the bank's webpage by the web server system 150, which asks the user to provide a unique username and/or ID number associated with the user. For instance, the user may be provided with the user interface depicted in FIG. 3, asking the user to provide a 10-digit identification number unique to the user and/or the user's account(s). The user may have been given or personally created this identifier when creating the account. In some embodiments, the user may not need to provide an identifier at all.

At 208, the computer system 150 receives the identifier provided by the user and generates a request for authorization that is communicated to the transaction authorization system 100. The request for authorization may include information describing the authorization request. In this example, the request for authorization may indicate that the request for authorization is for the acceptance of denial of the authorization and is related to the bank's online website. The request for authorization may further forward the user-provided identification number. In at least one embodiment, the identifier is communicated from the client device 140 to the transaction authorization system, without the intermediary receipt by the computer system 150.

At 212, based on the identifier, the transaction module 110 of the transaction authorization system 100 receives the transaction request—in this case, a request for entry into the user's checking account—and, with the authorization module 120, causes the generation of an encoded audio message containing a request for authorization. The audio message that is generated at the transaction authorization system 100 may be stored at the transaction authorization system 100 and transmitted to a client device for audio play. A request message is generated at the transaction authorization system 100 containing the audio request message in accordance with the receiving device. Thus, at 212, the transaction authorization system 100 generates a request message that may be processed at the client computer 160.

The transaction module 110 may store the authorization request information received from the computer system 150 at authorization database 125. In a preferred embodiment, the transaction module 110 further generates a request identification code to identify the request authorization session in question. The request identification code may be made up of numeral digits, letters, symbols and/or other characters and may of any length or structure. The request message, in this embodiment, contains the request identification code, which will be utilized by the transaction authorization system 100 to identify the authorization request when receiving a response form the client device 140. Further, in at least one embodiment, the request identification code is utilized to identify data stored at the authorization database 125.

At 216, the transaction authorization system 100 transmits the request message to the client computer 160. In one embodiment, the transaction authorization system 100 may transmit the message to the client computer 160 via web server system 150. In yet another embodiment, the transaction authorization system 100 may transmit a message that causes the web server system 150 to generate the encoded audio message for processing at the client computer 160. Thus, while some exemplary embodiments of the present invention may describe the message as being generated at the transaction authorization system 100, other embodiments well within the scope of the present invention may also cause the generation of one or more of these messages at various intermediary or third party computer systems. These intermediary or third party computer systems may be further charged with embedding the request identification code into the messages.

At 220, in response to the receiving of the audio transmission, the client computer 150 automatically processes the audio transmission and plays the audio message encoded therein. An encoded audio message may be a sequence of tones created according to a digital pattern. This sequence can be created according to a proprietary, licensed or public domain algorithm, being composed of tones that can be audible or inaudible to humans. The encoded audio message may also be a song, a tune, or other forms or combinations of sounds and tones. The encoded audio message may also be in the form of a voice message, a message inaudible to human ears or even audio that is presented as part of a movie or video clip. Thus, various forms of the encoded audio message may be utilized in accordance with any number of circumstances and may be configured by an administrator of the transaction authorization system 100 or the user. The administrator, for example, may output an audio message to instruct the user with spoken steps necessary for completing the authorization request. The audio may also be utilized to provide the user with additional information, to provide advertisements to the user, or to show the various banking or business features available to its customers. Where the audio environment may be audibly controlled or limited, high or low frequency audio or vibration-based audio may be played.

Figure 4:
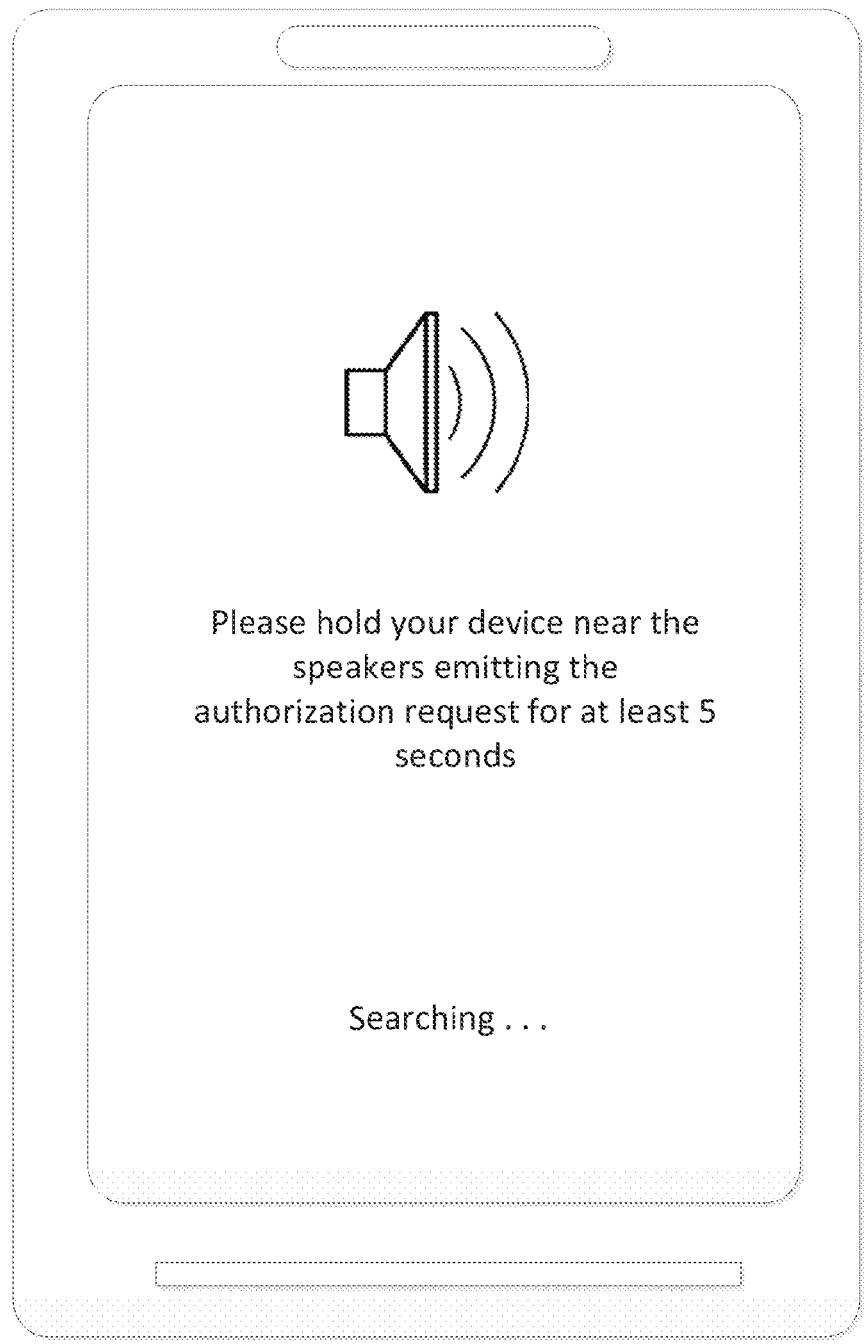
FIG. 4 depicts an exemplary user interface at the client device in accordance with an embodiment of the present invention.

Prior to or while the audio message is being played, the user may be instructed to activate his or her client device 140 to receive the audio message. The web page of the bank, as shown at the user computer 160, may provide the steps to take in order to receive the audio message, such as the user interface depicted in FIG. 4. Thus, concurrently or prior to the play at audio message 220, the user may, at 224, activate the client device 140 to receive the audio message by activating the microphone of the client device 140. The user may activate an application installed on the client device 140 or a feature preconfigured on the client device 140 that activates the microphone to receive the encoded audio. Upon activation, the user may hold the client device 140 at a position proximate to the audio source playing the encoded audio, such as near the speakers of the client computer 160. The client device 140 may also be adapted to receive commands via body gestures, voice, audio signals, device movement and/or the like, so that it can help the user to perform the functions of authorization of requests with the mobile device environment.

At 228, the encoded audio message received by the client device 140 is processed. In a one embodiment, the encoded audio message is directed to the client device 140 and may only be decoded by the client device 140. The audio message may also be encrypted using a key or algorithm unique to the client device 140. In certain embodiments where the information encoded in the encoded audio message is encrypted, the encoded audio message may only be understood by certain devices and/or applications, such as those that contain or maintain access to an encryption key or other similar means for decrypting the information encoded in the encoded audio message. Encryption may be completed by any encryption method now known or later developed. Examples of encryption may include, but are not limited to, manual encryption, transparent encryption, symmetric encryption, asymmetric encryption, and the like.

Once the message has been decrypted, the client device 140 may determine the request identification code. At 230, the client device 140 may automatically connect to the transaction authorization system 100 via computer network 130 and provide the decrypted request identification code. The communication between the client device 140 and the transaction authorization system 100, in the preferred embodiment, is encrypted. Based on the request authorization code the transaction authorization system 100 may access its authorization database 125 to identify the details of the authorization request. For example, the authorization database 125 may contain an entry associated with the request identification code. The entry may describe the authorization request, such that the transaction is an authorization for access to the bank account system associated with computer system 150 and that an approval or denial for access is requested. At 232, the authorization transaction system 100 provides the authorization request information to the client device 140, such as via network 130. In one embodiment, the authorization request information is communicated from the transaction authorization system 100 and received at the client device 140 via an encrypted audio message, similar to the method described above at 212-228.

Figure 6:
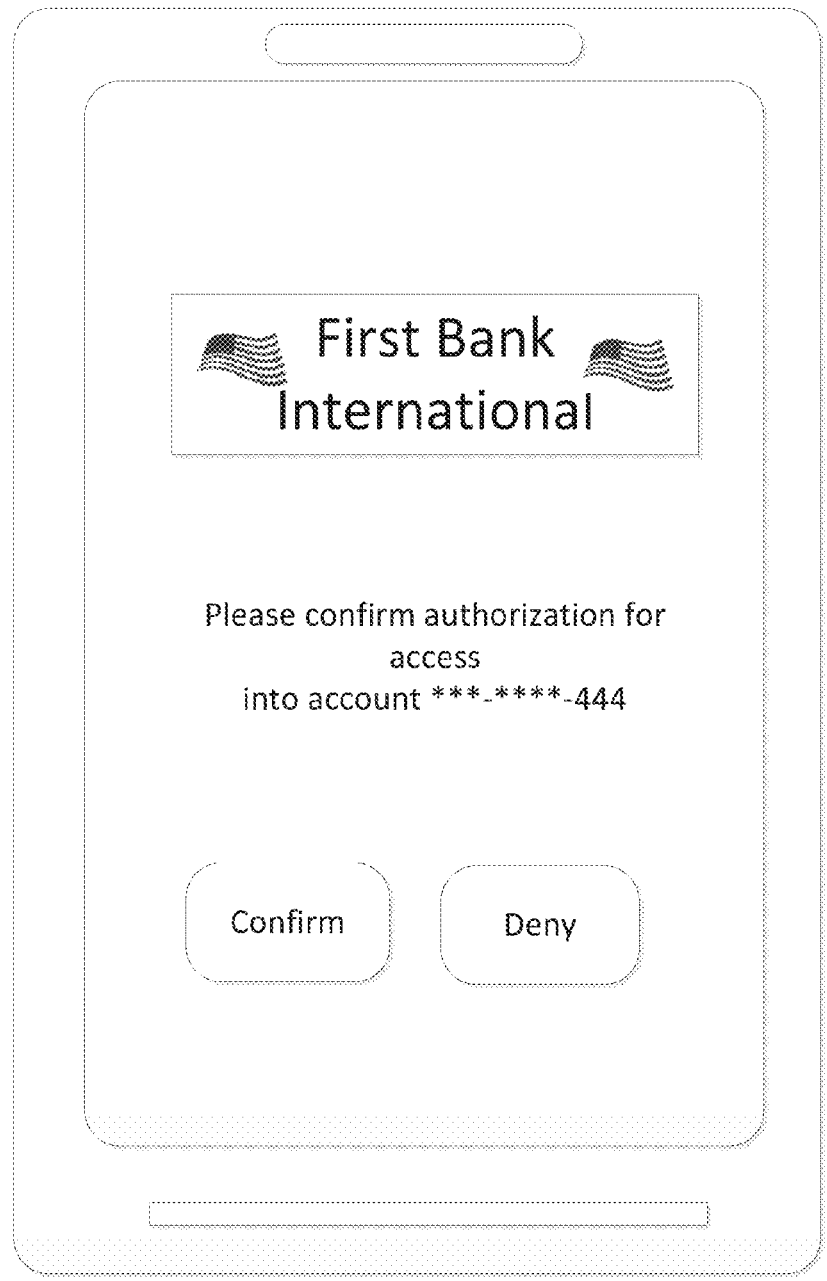
FIG. 6 depicts an exemplary authorization request user interface at the user device in accordance with an embodiment of the present invention.

In accordance with the authorization request information, client device 140 may generate one or more user interfaces for display to the user to request authorization at 236. For instance, to gather authorization to gain access into the user's checking account, the user may be shown the user interface depicted in FIG. 6, which asks the user to confirm or deny authorization for entry.

At 236, the user's response is received. At 240, the authorization response is processed to generate and transmit an authorization response to the transaction authorization system 100. An authorization response for example, may contain the request authorization code, the authorization response (e.g., yes or no), as well as any metadata information, which may contain time stamps, location coordinates, and other information. The authorization response may be transmitted to the transaction authorization system 100 at 240.

At 244, the transaction authorization system 100 receives and processes the authorization response. Where authorization has been granted, the transaction authorization system 100 may communicate with one or more modules—internal or external—to process and complete the transaction. With respect to the authorization request to access the user's account, the user may be granted access to the account. Utilizing the request identification code, the transaction authorization system 100 accesses the authorization database 150 which contains a corresponding authorization request identified by the code, along with information describing the transaction and the authorization request. Based on this entry and the authorization response, the transaction authorization system 100 may notify the computer server system 150 to provide the computer 160 with access to the user's account. Computer 160 is then provided access to the account at 248.

Where authorization has not been granted, the transaction authorization system 100 may notify the computer server system 150 that access has been denied and the user may be provided with an indication of the denial at 252. Furthermore, the transaction authorization system 100 may log the authorization response in a transaction authorization log.

In one embodiment, the transaction authorization system 100 determines whether the request identification code is valid. Where it is determined to be valid, the transaction authorization system 100 may optionally send a confirmation request to the user to confirm the authorization terms. The confirmation request may be sent, for example, by email, by text message, by telephone call, by a message displayed on the user's mobile device, and/or the like. The transaction authorization system 100 may then determine whether the user confirms that the confirmation request is correct. Confirmation may generally be in the form of a response from the user, such as, for example, responding to an email, text message or telephone call, clicking a link on a website, clicking a button in the mobile application environment, and/or the like. A period of time may elapse before a confirmation is deemed to have not been received. The period of time is not limited by this disclosure, and can be any period of time that may be set by, for example, the entity, the user or the application environment. In an embodiment, the period of time may be in a range of about 1 second to about 365 days.

If the transaction authorization system 100 receives confirmation from the user, the computing device may transmit an authorization notice to the computer server system 150. The authorization notice is not limited by this disclosure, and may be a message, a notification, a transmission and/or the like. The authorization notice may further be a simple "APPROVED" statement, may identify the request, may identify the entity and/or the user, may provide additional information regarding the request, and/or the like. The authorization notice may be provided via any method, such as, for example, an email, a text message, a telephone call, a postal mailing, a facsimile transmission, a text notification on a mobile device, a video notification on a mobile device, an audio notification on a mobile device, a haptic notification on a mobile device, and/or the like.

Figure 5A:
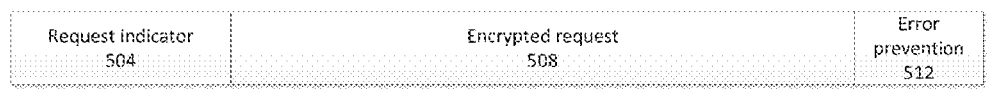
FIGS. 5A, 5B, 5C and 5D depict the audio structure of the audio authorization request in accordance with embodiments of the present invention.

In one embodiment, in addition to the request identification code, the authorization request information is also embedded into the audio message that is communicated and outputted at 220. By including all of the transaction authorization request information, client device 140 may not need to request the information from the transaction authorization system 100 at 230 and wait for a response at 232. Instead, the client device 140 may simply process the information at 228 and display the request authorization information to the user, at 236. An exemplary structure of the audio message containing the embedded authorization request information is shown in FIG. 5A in accordance with an embodiment of the present invention. The encoded audio message contains a request indicator portion 504, encrypted request portion 508, and error prevention portion 512. The portions may be repeated within a particular outputted audio, thereby, allowing client devices to receive the audio message even if the device was not activated at the start of the encoded audio message output. The repetitious nature of the audio message may also be utilized for error detection and correction. The request indicator portion 504 may identify to the client device 140 that the message is a transaction authorization request message. The client device 140 may also utilize the request indicator portion 504 to identify the locations of the remaining portions of the request message. In addition, the client device 140 may process the error portion 512 to ensure that the digital request message does not contain any errors. For example, the error portion 512 may contain parity bits, checksum bits, cyclic redundancy check bits, cryptographic hash bits, error-correcting data, or other error detection and correction-type data.

In one embodiment, the encoded audio message 235 may be encoded with data, such as data having a unique identifier that may generally be used by a computing device to gain access to secured information and unsecured information. Examples of secured information may include, but are not limited to, information regarding a user's banking account, an amount of money to be sent and/or received, a date and time of transmission of money for future payments, and/or the like. Examples of unsecured information may include, for example, information regarding a product or a service, information regarding a merchant, purchase payment information, information about a bill and purchase order information.

In some embodiments, the encrypted request portion 508 may only be decrypted by the client device 140 with a decryption key, which may have been previously provided to the device upon the creation of the account. Furthermore, the decryption of the encrypted request portion 508 may require a combination of the key and other information or data, including data contained in the request indicator portion 504, the encryption portion 508, the time of the request, the user's location and other information.

Figure 5B:

In another embodiment, the encoded audio message contains a decryption identification or key embedded therein. For example, an exemplary encoded audio message is shown in FIG. 5B. As shown, like the request message of FIG. 5A, the message contains request indicator portion 504, encrypted request portion 508, and error prevention portion 512. In addition to these portions, the audio request message of FIG. 5B may further contain a device identifier 506. Prior to decoding the encrypted request portion 508, the client device 140 may automatically determine whether the device identifier 506 matches the client device 140's identifier, which may be stored at the client device 140. Where there is a match, the client device 140 may proceed to decode the request message accordingly. Where there is not a match, the client device 140 may generate an exception message to be transmitted to the transaction authorization system 100 indicating the device identifier 506 did not match. The device 140's authorization response may indicate authorization for access was denied. The user may be provided with a message indicating the error or outcome on the user's client device 140 and/or computer 160.

It should be readily appreciated that multiple decoding and/or decryption stages may be utilized. Thus, an embodiment of the present invention may decrypt and/or decode different portions of the message utilizing different information or may require the decryption or decoding of the entire digital message multiple times utilizing different algorithms and/or keys before the encrypted request portion 508 may finally be interpreted and processed by the client device 140. Furthermore, embodiments of the present invention may contain both a device identifier within the received encoded audio message and may further require the decryption of the audio message using a decryption key available only to the device for which the request message is directed. In addition, the decryption/decoding methods disclosed herein may also be utilized where the encoded audio message is not of the structure described herein with reference to FIGS. 5A and 5B, such as when the encoded audio message only contains the request identification code.

Figure 5C:
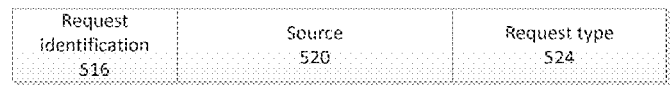

Once the encrypted request portion 508 has been decrypted, the decrypted request message may be processed by the client device 140. FIG. 5C depicts the structure of the decoded request message in accordance with an embodiment of the present invention to contain request identification portion 516, a source of the request source portion 520 and a request type portion 524.

Request identification portion 516 identifies the authorization request. In a preferred embodiment, the request identification portion 516 includes the request identification code. In one embodiment, the request identification code is a 32-character identifier that uniquely identifies the particular authorization request that is utilized by the transaction authorization system 100 and other systems, to identify the request and associated request information. For example, the 32-character identifier may be dynamically generated at the time the authorization request is created at the transaction authorization system 100. The identifier may be utilized as a key within one or more databases at the transaction authorization system 100 and may allow the transaction authorization system 100 to determine the device or computer associated with the original transaction request (e.g., web server 150 and client device 160), the client device 140's unique identifier, unique decoding key (if applicable), the audio authorization message status, and other information. As discussed further, portions of the request identification 516, including the 32-character identifier, may be included within the authorization response generated and transmitted by a client device to the transaction authorization system 100, which may then utilize the request identification 516 to locate the electronic transaction in question for processing.

The source of the request identification portion 516 identifies the source of the authorization request and may identify the network address of the transaction authorization system 100. Furthermore, the request type portion 524 identifies the type of the authorization request. The request received at client device 140, for example, may identify the request as an authorization request for access to a financial account. In addition, as described in other portions of the specification, authorization may be requested for: the access to financial or non-financial accounts, website or other physical, logical, or other locations; the access to data; the purchase or selling of merchandise, financial instruments, and other products and assets, tangible or intangible; the acceptance or denial of proposed trades or offers; voting or polling; the signing or execution of a legal or non-legal agreement or other document; enrollment; the acknowledgement of receipt, possession, or knowledge; the demonstration of one's identity; hardware triggering or coupling; and others. A person of ordinary skill in the art would readily recognize that the uses of the disclosed transaction authorization systems and methods need not be limited to the authorization scenarios outlined in this disclosure but, indeed, may include others in which authorization for a transaction is necessary.

In certain circumstances, additional information may be required in addition to an approval or denial of an authorization request. The additional information may, for instance, be complementary data related to the transaction, to the user, to the user's account, or the authorization request. For example, the user may be requested to: provide a proposal for a purchase price (such as when the authorization request is related to an auction); to select a credit card to pay for an item; to select a delivery or billing address/method; to select quantity to purchase or sell; to provide a message in sending a gift to a recipient; to select the candidate or choice to vote for; to provide the user's current physical location; to select the particular merchandise desired where there are different types (e.g., different color, size, weight, etc.); to provide a signature; to enter additional identification information; to answer questions; and other data or information needed to complete a transaction.

Figure 2A:
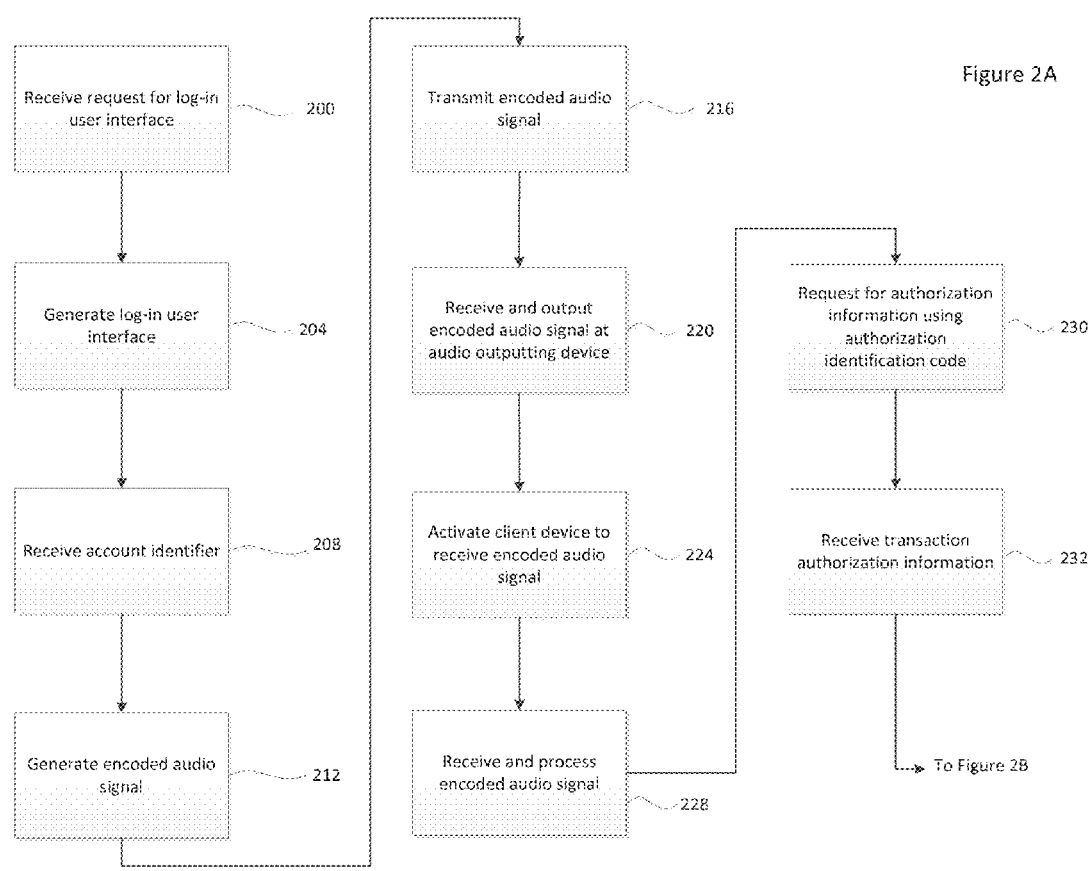
Figure 3:
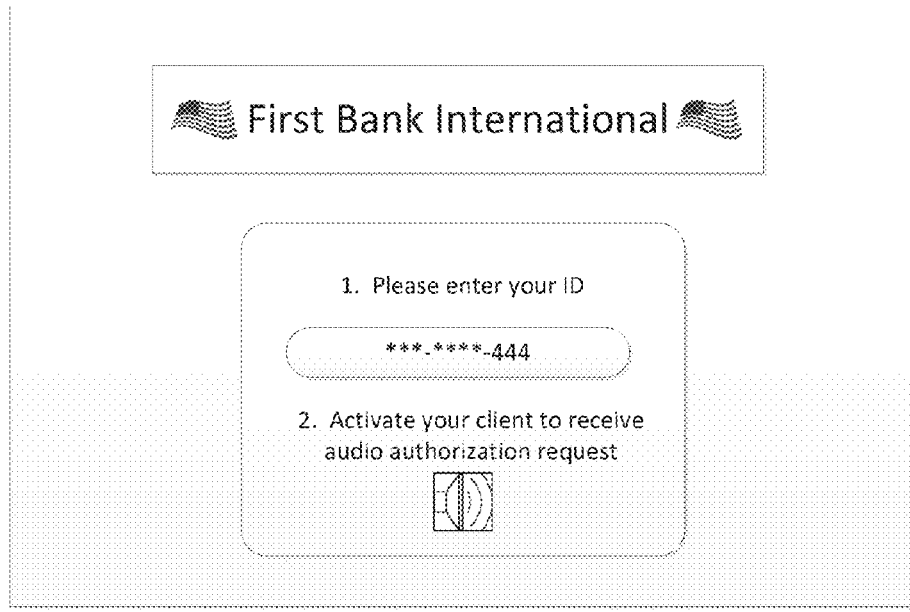
FIG. 3 depicts an exemplary log-in user interface in accordance with an embodiment of the present invention.

Therefore, in certain instances, after 232 of the method depicted in FIGS. 2A and 2B, the client device 140 may transmit to the transaction authorization system 100 a request for all complementary data requirement related to the authorization request at 256. In at least one embodiment, the request for complementary data is included in the client device 140's request for request authorization information at 230. In response, at 260, the transaction authorization system 100 provides the user device with complementary data required to authorize or complete the transaction. For instance, the transaction authorization system 100 may require that the user select which account (e.g., checking or savings account) the user is requesting to access. At 236, in addition to confirming the authorization request, the user may be required to identify which account the user wishes to access. Thus, in cases where additional complementary information is required to be input by the user, the user may be requested, at 236 to further enter the information as necessary. In one embodiment, the user's entry of the complementary information is an indication of authorization to complete the transaction. The user response may be received at the transaction authorization system 100 as part of the authorization response and may be processed to identify the selected account. The user may then be given access to the selected account at 248.

Figure 5D:
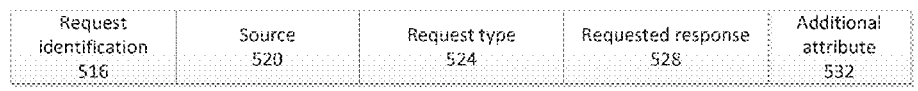

In one embodiment of the present invention, the complementary data requirements may be included as part of the encoded audio message communicated to the client device 140 at 220. FIG. 5D depicts the structure of a decoded request message contained in the authorization request in accordance with an embodiment of the present invention. In addition to the request identification portion 516, a source of the request portion 520 and a request type portion 524 (FIG. 5C), the decoded request message further contains a requested response portion 528 and additional attribute portion 532. The requested response portion 528 may simply indicate that the response be a simple grant or denial of authorization (i.e., yes or no to proposed transaction), or may also indicate any complementary data requirements. In this manner, the number of communications for completion of an authorization request may be reduced as the communications between the client device 140 and transaction authorization system 100 at 254 and 258 need not be taken.

Figure 7:
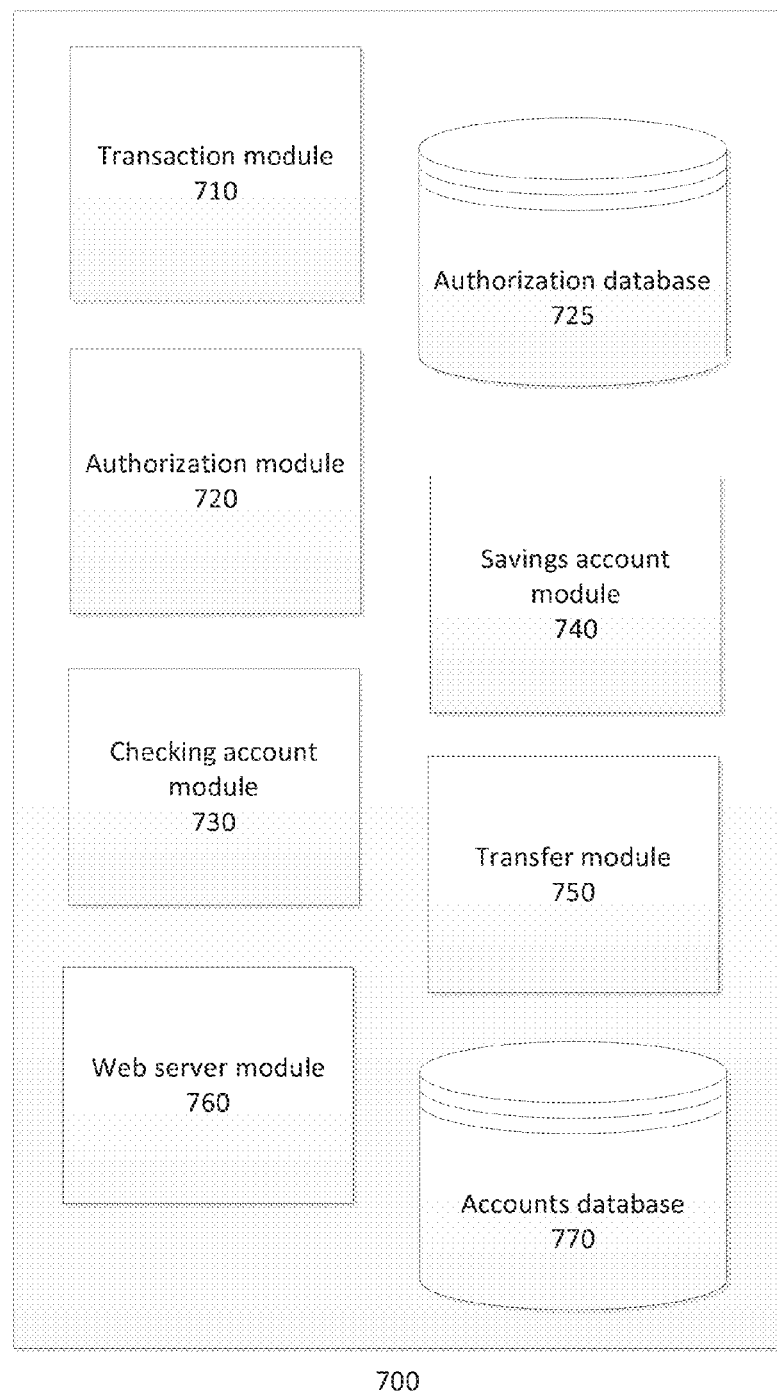
FIG. 7 depicts a banking system containing the transaction module and authorization module in accordance with an embodiment of the present invention.

The transaction authorization system 100 may be implemented to operate with one or more computer systems requiring transaction authorization verification, such as a bank, an investment firm, or a business. Some or all portions of the transaction authorization system 100 may also be integrated within one or more of these systems. For example, as depicted in FIG. 7, a transaction module 710, authorization module 720, and authorization database 725 may be integrated within a banking system 700, containing a checking account module 730, savings account module 740, transfer module 750, web server module 760, and accounts database 770. The transaction module 710 and authorization module 720 may verify authorization requests to access user checking and savings accounts managed by the checking account module 730 and savings account module 740 including access requests via the bank's web site managed by the web server module 760. Furthermore, the transaction module 710 and authorization module 720 may verify authorization to initiate or accept transfer requests managed by transfer module 750 and verify authorization to access, modify or delete account and associated data contained at the accounts database 770. It should be appreciated that the transaction authorization system 100, including its modules and databases, may be implemented in one or more systems of currently implemented systems to facilitate the initiation, processing, and completion of transactions in any number or types of businesses or fields.

The modules of the transaction authorization system may be embodied in software executed by a processor on one or more computer systems and/or servers and may even be executed on a machine local to a user. For example, the modules of the transaction authorization system may be a software application executing within a web browser (e.g., a JAVA® Applet) at a client computer or device. The modules may contain or have access to storage modules that contain some or all of the data received, utilized, and processed by the transaction authorization system 100 and may consist of more than one storage module located at a number of locations.

As used herein, references to "system(s)," "computer(s)," "machine(s)" and/or "device(s)," may include, without limitation, a general purpose computer that includes a processing unit, a system memory, and a system bus that couples various system components including the system memory and the processing unit. The general purpose computer may employ the processing unit to execute computer-executable program modules stored on one or more computer readable media forming the system memory. The program modules may include instructions, routines, programs, objects, components, data structures, etc., that perform particular tasks or implement particular abstract data types. The "system(s)," "computer(s)," "machine(s)" and/or "device(s)," may assume different configurations and still be consistent with the invention, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices. Thus, for example, a client device may be a personal computer, a mobile device (e.g., mobile phone, smart phone, tablet), or even an automobile, or appliance including a processing unit and system memory.

Moreover, as used herein, references to "a module," "modules", "function", and/or "algorithm" generally mean, but are not limited to, a software or hardware component that performs certain tasks. The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

Thus, a module may include, by way of example, components, such as software components, object-oriented software components, class libraries, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or be further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application modules.

As illustrated, the system 100 is connected to the devices, computers and systems by way of a network, such as computer network 130. Computer networks consistent with exemplary embodiments of the invention, including computer network 130, may be a wired or wireless local area network (LAN) or wide area network (WAN), a wireless personal area network (PAN), and other types of networks. Furthermore, the computer networks may be connected to the Internet and the World Wide Web. In addition, while compute network 130 may be depicted as a single network, this and other networks described herein may be a single computer network or be made up of a number of networks contained therein. When used in a LAN networking environment, computers and systems may be connected to the LAN through a network interface or adapter. When used in a WAN networking environment, computers typically include a modem or other communication mechanism. Modems may be internal or external, and may be connected to the system bus via a user-input interface, or other appropriate mechanism. Computers and a server running the modules may be connected over the Internet, an Intranet, an Extranet, an Ethernet, or any other network that facilitates communications. In addition, any number of transport protocols may be utilized, including, without limitation, the User Datagram Protocol (UDP), Transmission Control Protocol (TCP), Venturi Transport Protocol (VTP), Datagram Congestion Control Protocol (DCCP), Fiber Channel Protocol (FCP), Stream Control Transmission Protocol (SCTP), Reliable User Datagram Protocol (RUDP), and Resource Reservation Protocol (RSVP). For wireless communications, communications protocols may include Bluetooth, Zigbee, IrDa, or other suitable protocol. Furthermore, components of the systems described herein may communicate through a combination of wired or wireless paths.

In addition, the transaction authorization system 100 is shown in FIG. 1 to be connected to television network 142 and radio network 144. Television and radio networks consistent with exemplary embodiments of the invention may include at least one or more television and radio stations capable of transmitting television and radio signals and messages receivable by televisions and radios in manners known in the art. Television network 142 and radio network 144 may contain a plurality of television and radio transmitter/receiver stations, including origination stations, intermediate stations, and receiving stations. Thus, embodiments of the present invention may be implemented to operate in or with existing television and radio networks comprising of various stations that, together, facilitate the origination and transmittal of the television and radio signals and messages from a source location through various regional and local stations and ultimately to be received at a receiving television/radio within a home, office, car, and various other locations. Embodiments of the present invention, such as the transaction authorization system 100 may also be implemented within systems located at any television and radio station, or, as depicted in FIG. 1, may be connected to these stations via a network, be they computer network 130, television network 142, radio network 144, or others.

In one exemplary embodiment, a user may interface with the devices and computers (e.g., client device 140 and computer 160) via a user interface. The user may enter commands and information through the user interface, such as through input devices such as a keyboard, a touch-screen, and/or a pointing device—e.g., a mouse, trackball or touch pad. In one embodiment, the user interacts with the modules and its various component modules using these and other input devices in conjunction with a graphical user interface (GUI) provided on the devices and computers, or hosted on a server (such as a server also hosting the transaction authorization system 100), and accessed by a terminal or internet browser local to the client or system. In one exemplary embodiment, the GUI is a web-portal on an organization's intra-net site.

As briefly discussed above, the computer systems disclosed herein, may include a general purpose computing device in the form of a computer including a processing unit, a system memory, and a system bus that couples various system components including the system memory to the processing unit. Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, PHP, Prolog, Python, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each processor and/or memory may be composed of different physical pieces of equipment.

A participant may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a participant input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Devices, computers and systems are described here to communicate with one another through the use of one or more generated "message(s)" and/or signal(s)". It should be appreciated that the use of these terms is not meant to be limiting to the scope of the invention in anyway and should be interpreted broadly as to include the transmittal of information and/or data from one device, computer, and/or systems to another. Furthermore, the structure of the information, including the order or placement of information should not be interpreted to be limited to the embodiments described herein, an in fact may be in a number of other order and structure. Authorization requests, authorization responses, and other information communicated between the devices, computers, and systems described herein may include additional information or may contain only some of the information described in the exemplary embodiments. The order and structure of the authorization request and responses depicted in exemplary Figures, such as those in FIG. 5, are to allow a person of ordinary skill in the art to appreciate the content of an authorization request and response in accordance with an embodiment of the present invention and not meant to limit the structure of the request and responses to those shown.

In addition to the use of computer 160, various other devices may be utilized in embodiments of the present invention to output authorization requests in the form of encoded audio messages. For instance, the present invention allows for transactions to be initiated by any existing device or system capable of outputting audio, including mobile device 162, television 164, radio 166, and general audio capable device 168.

Figure 8:
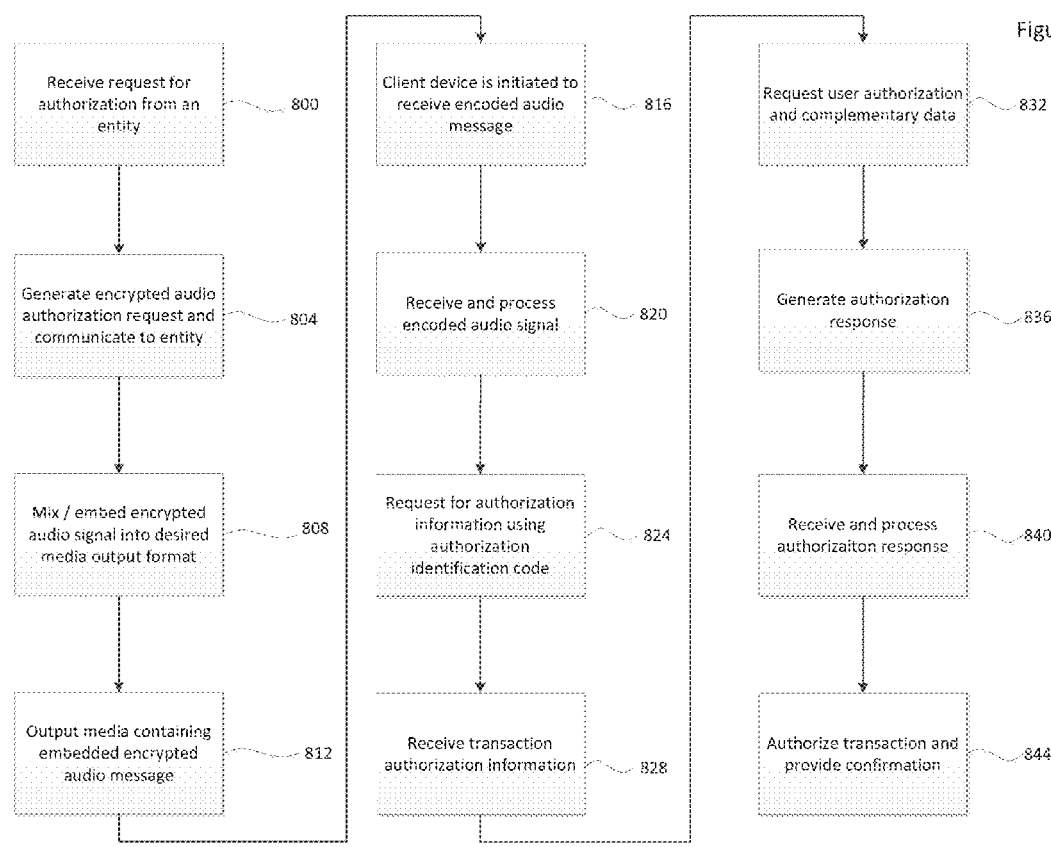
FIG. 8 depicts a flow chart illustrating a method for verifying authorization of a transaction initiated by a television in accordance with an embodiment of the present invention.

FIG. 8 depicts a flow chart illustrating a method for verifying authorization of a transaction initiated by a television in accordance with an embodiment of the present invention. An entertainment company, such as entity 180, would like to broadcast a 1-hour long historical documentary to its television viewers and would like to also provide the viewers the options to purchase the episode that is broadcasted. Thus, at 800, entity 180 may communicate a request for authorization to the transaction authorization system 100, identifying the entity 180 and describing the authorization request. At 804, the transaction authorization system may generate an encrypted audio message containing the request identification code unique to the entity 180's specific authorization request and communicates the encoded audio message to the entity 180 via network 130. The encoded audio message, for example, may be a way, mp3, or other audio-formatted file. At 808, the entity 180 may mix or embed the audio message into the documentary video's audio track and communicate the documentary video containing the embedded authorization request to a television network system 152.

At 812, a television network system 152 may cause the broadcast of the 1-hour long historical documentary that is received by the television 164 via television network 142. During the broadcast, the host of the show states: "If you would like to have this documentary episode automatically downloaded to your home entertainment center, open up the authorization app on your tablet." At this point, the portion of the documentary containing the embedded audio authorization message is outputted from the user's television. The encoded audio message may be embedded within the audio outputted for the remainder of the television episode or for portions thereof. At 816, the user, wishing to purchase the documentary episode, initiates the client device 140, in this case, a computer tablet.

At 820, the computer tablet, which contains an audio microphone or other audio recording device, receives and processes the audio message. By processing the audio message, the client device 140 may determine the request identification code. Because the audio authorization request is transmitted to all television viewers, an administrator associated with the television network may consider that there are little benefits gained with data security within an authorization request broadcast to the public. Accordingly, the audio message may not be encrypted. Of course, it should be appreciated that in certain circumstances, the encoded audio message may still contain an encrypted request portion.

At 824, the client device 140 may automatically connect to the transaction authorization system 100 via computer network 130 and provide the request identification code. Based on the request authorization code the transaction authorization system may access its authorization database 125 to identify the details of the authorization request. At 828, the authorization transaction system 100 provides the authorization request information to the client device 140, such as via network 130.

Figure 9:
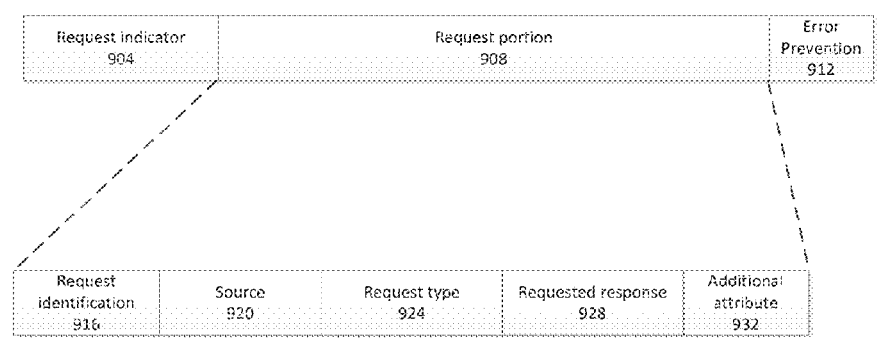
FIG. 9 depicts the audio structure of the audio authorization request in accordance with an embodiment of the present invention.

FIG. 9 depicts structure of the encoded audio message according to one embodiment of the present invention where the encoded audio message contains authorization request information in addition to the authorization identification code. In such embodiments, the operations described at 824 and 828 may not be needed. The encoded audio message, like the audio message of FIG. 5A, contains a request indicator portion 904 and error prevention portion 912. Furthermore, the encoded audio message contains a request portion 908. Unlike the encrypted request portion 508 of FIG. 5, however, the request portion 908 is not encrypted. As depicted in FIG. 9, the request portion 908 includes a request identification portion 916 that contains the request identification code; a source portion 920 that identifies the transaction authorization server 100; a request type portion 924 to identify the authorization request as a request for authorization to purchase merchandise; a request response portion 928 to identify that a credit card identification is needed; and an additional attribute portion 932 that identifies additional related episodes of the historical documentary for which the user may also purchase.

At 832, the processing of the authorization request causes a message to be displayed on the user device 140. In particular, a message may be displayed to the user asking whether the user would confirm the purchase the historical documentary episode. Upon confirmation, the user at 832 is asked to confirm the credit card to be used if one is already stored at the user device 140 (else or to enter the credit card information). In addition, the user interface of the client device may contain additional information about the historical documentary, including additional related episodes that the user can purchase.

At 836, the client device 140 generates an authorization response for transmission to the transaction authorization system 100 that includes the request identification code, the confirmation of authorization (e.g., yes or no), and the credit card information of the user. In a preferred embodiment of the present invention, portions or all of the authorization response is encrypted prior to transmission.

At 840, the transaction authorization system 100 receives the authorization response and processes the response accordingly. The transaction authorization system 100 may utilize the request identification to identify the particular authorization request in question within the database 125. Based on the authorization, the transaction authorization system 100 may determine that the transaction request and response are associated with the television network system 152 and the entity 180 (e.g., computer system associated with the 1 hour documentary broadcast). At 844, the transaction authorization system 100 may automatically communicate to the television network system 152 and/or entity 180 the user's payment information and authorization. In a preferred embodiment, the transaction authorization system 100 independently processes the transaction by communicating with one or more financial institutions to charge the user's credit card and confirm with the television network system 152 that the user should be provided one copy of the historical documentary. The transaction authorization system 100 further communicates a confirmation of the transaction with the client at client device 140.

Figure 10:
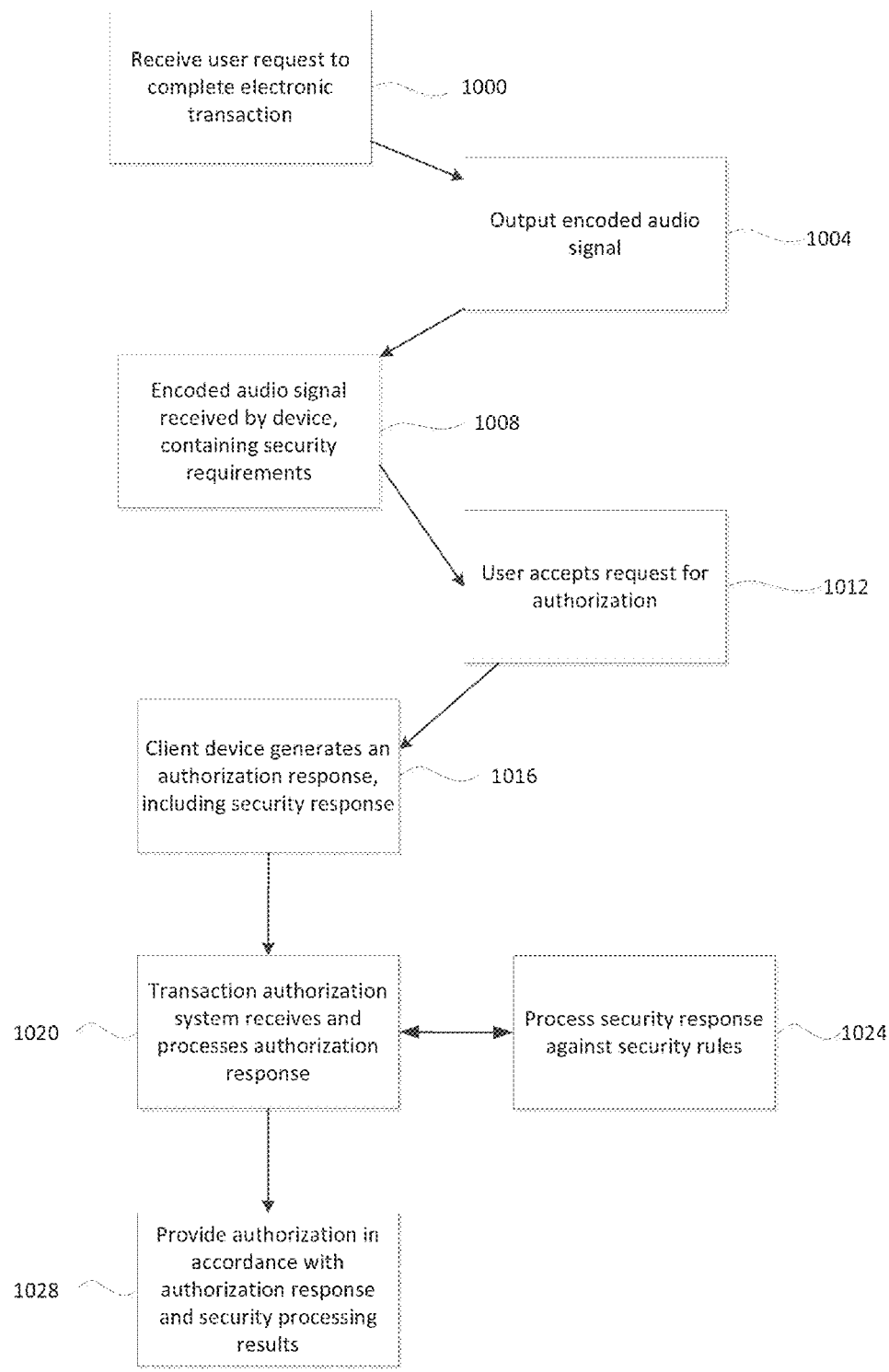
FIG. 10 depicts a flow chart illustrating a method for verifying authorization of a transaction based on location information.

In certain embodiments, user authorization is dependent on authorization rules, which may be set by the user or the entity. This allows for entities and users to set additional security requirements in order to reduce fraudulent transactions. FIG. 10 depicts a flow chart illustrating a method for verifying authorization of a transaction based on location information. In this example, the user has customized his account to only allow the withdrawal of cash from an Automated Teller Machine (ATM) if it is located within 15 miles of his home. Furthermore, the user's bank has required that bank transactions take place within the state of Virginia, or at least within the security parameters customized by the user. Thus, authorization rules may be prioritized or weighted in any manner.

At 1000, the user arrives at the ATM 168 (FIG. 1) located in downtown Washington, D.C. approximately 7 miles from the user's home in Virginia. The user requests to withdraw $100 from his checking account and swipes his bank card at the ATM 168. At 1004, the bank begins to play an encoded audio message containing an authorization request and, at 1008, the client device 140 contained in the user's pocket receives and begins to process the audio message. In one embodiment in particular, the client device 140 is automatically activated upon detection of the encoded audio message, even without user activation of the client device 140 or any applications. The encoded audio tune describes the authorization request, and contains a request for the Global Positioning System (GPS) location information of the device at the time of the response. As with other examples described herein, in at least one preferred embodiment, the encoded audio tune does not include detailed information of the authorization request, but may only include the request identification code. In these embodiments, the client device 140 may automatically retrieve authorization request information from the transaction authorization system 100 using the request identification code. At 1012, the user accepts the request for authorization by selecting a "grant" option shown on the user interface of the client device 140.

At 1016, in response to the user's acceptance of the authorization request, the user's phone generates an authorization response to be transmitted to the transaction authorization system 100. In addition to information indicating the user's approval of the authorization, the authorization response may contain the location information of the device, as gathered by location features already contained in the phone. For instance, the client device 140 may automatically gather location information from the device's GPS antenna, wireless antenna, and other available data for the client device 140. Various other information related to the client device 140 and the user, may be provided within the authorization response, such as a date and/or a time that the encoded audio message was captured, the type of mobile device used, username and password information used to access the application environment, and/or the like.

At 1020, the transaction authorization system 100 receives the authorization response and locates the authorization information accordingly. Using the client device 140's location information received, the transaction authorization system 100 determines whether this location information complies with each of authorization rules associated with the user's account and/or the authorization request. In particular, in one embodiment, the transaction authorization system 100 contains an authorization database containing a plurality of authorization rules, each of which may be associated with one or more users, accounts or client devices, including authorization rules set by both users and businesses. At 1024, the transaction authorization system 100 determines whether the user device is located within Virginia and within 15 miles of the user's home. Although the user and his device are located outside of Virginia at the time of the authorization response, the user and his device is still within 15 miles of his home in Virginia. Therefore, at 1024, it is determined that the authorization rules are in compliance. At 1028, in response to notification that authorization has been verified, the ATM provides the user with $100.

In one embodiment, the authorization rules set by the user and the entity are communicated as part of the authorization request to the client device 140. In another embodiment, the authorization rules may be retrieved by the client device 140 from the transaction authorization system 100 for processing authorization requests received by the client device 140. Upon receipt of the authorization request, the client device 140 may automatically determine whether the authorization rules are complied with. Based on this determination, the authorization response is generated and provided to the transaction authorization system 100 accordingly. Where the authorization rules are not in compliance, the authorization response may indicate that the authorization rules were not complied with because the client device 140 did not comply with the location requirement set by the user and/or the requirement set by the bank.

In addition to location information, other types of information may be utilized as part of an authorization rule, including time and day of response, the time it takes to respond, device type, user or device status, user presence or identity, device connection type, device connection strength, weather, user identification, financial market status, authorization type, and others.

Embodiments of the present invention may further allow authorization requests to be automatically received and stored within an authorization mailbox. The authorization mailbox, in one embodiment, is managed and accessible at the client device 140. In another embodiment, the authorization mailbox and the authorization requests contained therein may also be stored at the transaction authorization system 100.

Figure 11:
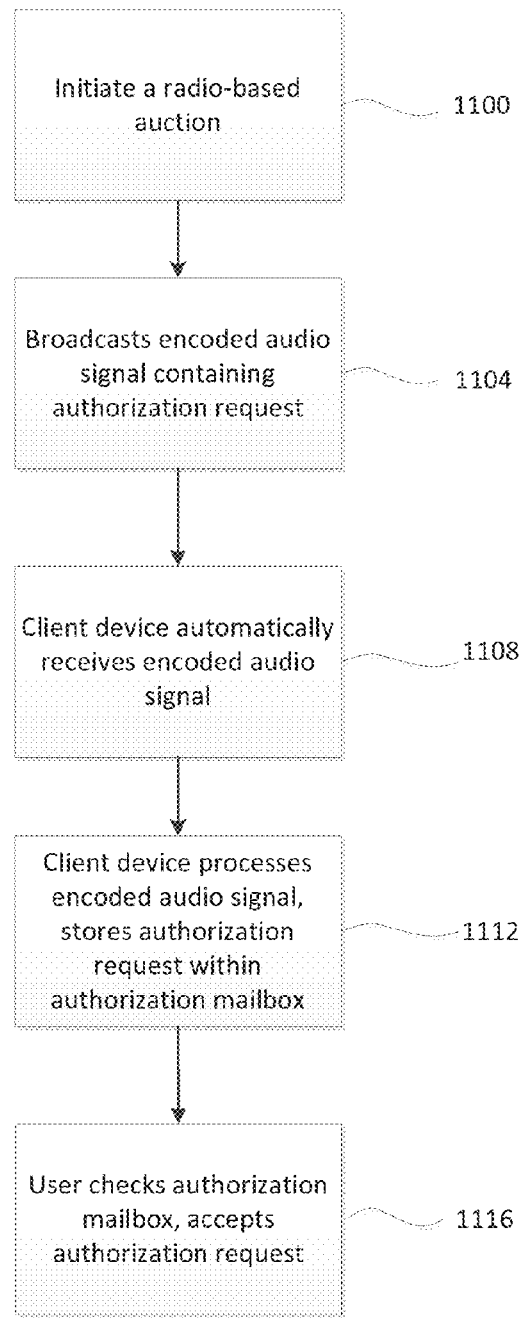
FIG. 11 depicts a flow chart illustrating yet another method for verifying authorization of a transaction.

FIG. 11 depicts a flow chart illustrating yet another method for verifying authorization of a transaction. At 1100, a radio-based auction is initiated and announced to its listeners. Listeners of a radio station are invited to send in offers for tickets to a music concert. As with other examples described, the company in charge of the music concert may communicate may communicate a request for authorization to the transaction authorization system 100, thereby causing the system 100 to generate an encoded audio message containing the authorization identification code. At 1104, the radio station network system broadcasts an encoded audio message containing an authorization request in the form of an encoded audio commercial describing the auction to the listeners. The audio commercial may be repeated once every hour for a period of a week. In one embodiment, the authorization request further contains information describing the expiration date of the authorization request. Therefore, after the auction period has ended, the user may no longer respond to the authorization request.

At 1108, the client device 140—in this case, a laptop—automatically receives the authorization request during one broadcast of the encoded audio commercial. In a preferred embodiment, the audio encoded message is automatically detected and recorded by the client device 140. At 1112, the authorization request is processed. In this case, it automatically determined that the authorization request is related to an auction for two concert tickets and the user is invited to send in an offer. Based on this information, an authorization request entry is created within the authorization mailbox of the client device 140.

At 1116, the user may check his authorization mailbox for any pending authorization requests and may learn of the auction to place an offer for the music concert. Deciding that he would like to attend the music concert, the user authorizes the authorization request and enters an offer price. The authorization response is communicated to the transaction authorization system 100 and his bid is recorded. Where the user has placed the highest bid and wins the tickets, the client device 140 may automatically be notified.

While the methods for verifying authorization of a transaction described above describes an authorization transaction as being conducted using one particular type of device, whether it is described as outputting the encoded audio message (e.g., a television or computer initiating the request via an encoded audio) or utilized to verify authorization (e.g., phone, tablet and laptop), it should be appreciated that these devices are described for exemplary purposes only and are interchangeable with other types of devices. For example, the method of FIG. 10 may be modified such that the encoded audio request is outputted at a personal computer, a network-connected car, a network and audio capable appliance, and others. Furthermore, it should be appreciated that the described use of one particular type of network over another (e.g., computer network versus television network) is not meant to be limiting and various other networks may be utilized as necessary.

Furthermore, embodiments discussed above are described to facilitate the authorization of a transaction between a user and another party, such as a bank, a television network and show, or a radio station/show. It should be appreciated that other embodiments within the scope of the invention may facilitate the authorization of transactions between users and any entity, between users, and even between entities. For instance, an "entity" may be considered an individual, a corporation, a financial services provider, a government, and/or the like, that prepares a request requiring authorization from a user. In addition, a "user" may be considered an individual, representing himself or a corporation, a financial services provider, a government, and/or the like, that receives the request requiring authorization in the form of an encoded audio message, and either approves or rejects the authorization. While this disclosure relates generally to a single entity and a single user, those skilled in the art will recognize that multiple entities and multiple users may be involved in a transaction without departing from the scope of this disclosure. Both the entity and the user may be authorized users of the application environment In one embodiment of the present invention, the transaction authorization system 100 may also be configured as a central authorization system that manages the authorization of any number of accounts across a plurality of businesses and fields, thereby providing a universal authorization platform through which a user may access to verify authorization for many or even all transactions made day-to-day.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made expressly herein, without departing from the spirit and scope of the invention. In fact, variations, modifications, and other implementations of what was described herein will occur to those of ordinary skill in the art without departing from the spirit and the scope of the invention. In particular, it should be understood that the order of steps or order for performing certain actions is immaterial so long as the invention remains operable. Two or more steps or actions may also be conducted simultaneously. As such, the invention is not to be defined only by the preceding illustrative description.

From the foregoing, it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations. This is contemplated and within the scope of the invention.

The invention claimed is:

1. A method of authorizing an electronic transaction, the method comprising:
   receiving, at an authorization computer system, a request for authorization from a requester;
   communicating, from the authorization computer system to an audio emitting device, a request signal containing an encrypted, encoded inaudible audio request message embedded in an audio message, said request signal causing the audio emitting device to output the audio message, including the inaudible audio request message, wherein the embedded message includes at least two different portions repeated in a repetition pattern within the audio message;
   wherein the outputted audio message, when detected by an audio receiving component of a receiving device physically separate from the audio emitting device, causes the receiving device to automatically perform at least the following:
   extract the inaudible audio request message embedded in the audio message;
   decrypt and decode the extracted inaudible audio request message and perform error detection based on the repetition pattern in the embedded message, the decrypted, decoded audio request message containing a request identifier, identifying a network address of the authorization computer system, a request type, and a requested response portion, the extracted audio request message causing a processor of the receiving device to execute a code module of the receiving device to generate an authorization request to a user based on the decoded audio request message,
   based on the request type, process a request authorization from the user in order to generate an authorization response containing the request authorization and the request identifier, wherein the authorization response includes a response field based on the requested response portion in the inaudible audio request message, and
   transmit the authorization response to the authorization computer system using the identified network address;
   receive, at the authorization computer system, the authorization response from the receiving device; and
   process the authorization response to provide authorization for the electronic transaction.

2. The method of claim 1, wherein the audio message comprises at least one of audible and inaudible tones.

3. The method of claim 1, wherein the request authorization in the authorization response indicates that the authorization is granted, the authorization is denied, or an exception.

4. The method of claim 1, wherein the processing of the authorization response includes processing the request identifier received in the authorization response to identify, in a database, the electronic transaction, the method further comprises the steps of:
   receiving an electronic transaction request;
   generating the request identifier in response to the electronic transaction request;
   storing in the database the electronic transaction request, the electronic transaction request being identifiable by the request identifier.

5. The method of claim 4, wherein the processing of the authorization response further includes the step of authorizing the electronic transaction based on identifying, in the database, the electronic transaction.

6. The method of claim 1, further comprising the step of communicating the authorization response to at least one transaction processing system.

7. The method of claim 1, wherein the outputted audio message is decodable only by a unique receiving device.

8. The method of claim 7, wherein the unique receiving device automatically decodes the audio message based on a unique decoding key, the method further comprising the step of:

generating the audio message based on the unique decoding key, the unique receiving device having access to the unique decoding key.

9. The method of claim 1, wherein the outputted audio message is decodable only by a plurality of devices.

10. The method of claim 1, wherein the audio message is addressed to at least one of: to a specific user, a specific device and users located within predetermined geographically limits.

11. The method of claim 10, wherein the audio message contains predetermined geographical limits data.

12. The method of claim 1, further comprising the steps of:
receiving a request for complementary data from the receiving device;
generating an encoded complementary audio message containing complementary information to the authorization request; and
communicating to the audio emitting device a complementary message containing the encoded complementary audio message, said complementary message causing the encoded complementary audio message to be outputted at the audio emitting device.

13. The method of claim 12, wherein the receiving device receives a complementary response from the user responsive to the complementary information, and wherein the authorization response includes the complementary response.

14. The method of claim 1, wherein the authorization request comprises at least one of a logical or physical access request, an electronic fund transfer request as a payment request, a user data request, a poll request, an agreement request, an enrollment request and a hardware triggering request.

15. A method of processing an authorization request at a mobile device physically separate from the audio emitting device, the mobile device containing a processor and memory, the mobile device capable of receiving and processing encoded audio messages from an authorization computer system, the authorization computer system receiving a request for authorization from a requester, the method comprising:
receiving, from an audio emitting device's output device, an audible encoded audio authorization request generated by the authorization computer system, the audible encoded audio authorization request containing an at least partially inaudible audio request message, said authorization request containing a request identifier identifying a network address of the authorization computer system, a request type, and a requested response portion;
recording the audible encoded audio authorization request using an audio recording component of the mobile device to process the authorization request;
extracting the inaudible audio request message embedded in the audible encoded audio authorization request;
automatically decrypting and decoding, using the processor, the audible encrypted, encoded authorization request, and performing error detection based on a repetition pattern in the embedded message, wherein the embedded message includes at least two different portions repeated in a repetition pattern within the audio message, wherein the decrypted, decoded audio request message causing the processor to execute a code module of the receiving device to provide at least a portion of the decrypted, decoded authorization request to a user based on the recorded audible encoded authorization request;
receiving a request authorization from the user;
based on the request type, generating, using the processor, an authorization response containing the request authorization and the request identifier, wherein the authorization response includes a response field based on the requested response portion in the inaudible audio request message; and
transmitting the authorization response to the authorization computer system using the identified network address to provide authorization.

16. The method of claim 15, wherein the encoded audio authorization request comprises at least one of audible and inaudible tones.

17. The method of claim 15, further comprising the step of determining, using the processor, whether the encoded audio authorization request is a valid encoded audio authorization request according to at least one authorization rule stored in memory.

18. The method of claim 15, wherein at least one authorization rule is based at least on the physical location of the mobile device, the identity of the device, or the identity of the user.

19. The method of claim 15, wherein the encoded audio authorization request is encoded based on a unique decoding key, said mobile device having access to the unique decoding key, and wherein the encoded audio authorization request is decoded based on the unique decoding key.

20. A system for facilitating the authorization of electronic transactions, the system comprising:
a processor;
at least one storage device coupled to the processor; and
wherein the processor is adapted to communicate with the at least one storage device to execute instructions to perform the following:
communicating to an audio emitting device a request signal containing an encoded inaudible audio request message embedded in an audio message, said request signal causing the audio emitting device to output the audio message, including the inaudible audio request message, wherein the embedded message includes at least two different portions repeated in a repetition pattern within the audio message;
receiving an authorization response from a receiving device physically separate from the audio emitting device, the authorization response containing a request authorization and a request identifier; and
processing the authorization response to provide authorization for the electronic transaction;
wherein the outputted audio message, when detected by an audio receiving component of the receiving device, causes the receiving device to automatically perform at least the following:
extract the inaudible audio request message embedded in the audio message;
automatically decrypt and decode the extracted inaudible audio request message and perform error detection based on the repetition pattern in the embedded message;
the decrypted, decoded audio request message containing the request identifier identifying a network address of the authorization computer system, a request type, and a requested response portion, the extracted audio request message causing a processor of the receiving device to execute a code module of the receiving device to generate an authorization request to a user based on the decoded audio request message; and based on the request type, process a request authorization from the user in order generate the authorization response to transmit to the identified network address, wherein the authorization response includes a response field based on the requested response portion in the inaudible audio request message.

21. The system of claim 20, wherein the audio message comprises at least one of audible and inaudible tones.

22. The system of claim 20, wherein the request authorization in the authorization response indicates that the authorization is granted, the authorization is denied, or an exception.

23. The system of claim 20, wherein the processing of the authorization response includes processing the request identifier received in the authorization response to identify, in a database, the at least one storage device, the electronic transaction, wherein the processor is further configured to perform the following:
   receiving an electronic transaction request;
   generating the request identifier in response to the electronic transaction request;
   storing in the database the electronic transaction request, the electronic transaction request being identifiable by the request identifier.

24. The system of claim 23, wherein the processing of the authorization response further includes the step of authorizing the electronic transaction based on identifying, in the database, the electronic transaction.

25. The system of claim 20, further comprising the step of communicating the authorization response to at least one transaction processing system.

26. The system of claim 20, wherein the outputted audio message is decodable only by a unique receiving device, the method further comprising the step of:
   generating the audio message based on a unique decoding key, wherein the unique receiving device has access to the unique decoding key and the unique receiving device automatically decodes the audio message based on the unique decoding key.

27. The system of claim 20, wherein the audio message is addressed to at least one of: to a specific user, a specific device and users located within predetermined geographically limits.

28. The system of claim 20, wherein the processor is further configured to perform the following:
   receiving a request for complementary data from the receiving device;
   generating an encoded complementary audio message containing complementary information to the authorization request; and
   communicating to the audio emitting device a complementary message containing the encoded complementary audio message, said complementary message causing the encoded complementary audio message to be outputted at the audio emitting device.

29. The system of claim 28, wherein the receiving device receives a complementary response from the user responsive to the complementary information, and wherein the authorization response includes the complementary response.

30. The system of claim 20, wherein the authorization request comprises at least one of a logical or physical access request, an electronic funds transfer request as a payment request, a user data request, a poll request, an agreement request, an enrollment request and a hardware triggering request.

* * * * *